United States Patent [19]
Cohen et al.

[11] Patent Number: 5,719,905
[45] Date of Patent: Feb. 17, 1998

[54] SPREADING OF SPURIOUS SIGNALS

[75] Inventors: Yakov Cohen, Haifa; Ezra Nishri, D.N. Misgav, both of Israel

[73] Assignee: State of Israel-Ministry of Defense Armament Development Authority-Rafael, Haifa, Israel

[21] Appl. No.: 317,629

[22] Filed: Oct. 3, 1994

[30] Foreign Application Priority Data

Oct. 3, 1993 [IL] Israel .................................. 107170

[51] Int. Cl.$^6$ .................................................. H03D 1/04
[52] U.S. Cl. .................. 375/346; 455/63; 455/253; 455/296; 455/315; 327/551
[58] Field of Search .................. 341/87, 110, 131, 341/200; 375/200, 214, 245, 202, 254, 296, 346, 204; 455/43, 260, 20, 283, 50.1, 61, 63, 67.3, 115, 114, 226.1, 285, 302, 183, 209, 253, 311, 314, 315, 296; 348/607, 613; 342/13–15

[56] References Cited

U.S. PATENT DOCUMENTS

| | | | |
|---|---|---|---|
| 4,545,072 | 10/1985 | Skutta et al. | 455/183 |
| 4,713,662 | 12/1987 | Wiegand | 342/13 |
| 4,885,587 | 12/1989 | Wiegand et al. | 342/14 |
| 4,910,752 | 3/1990 | Yester, Jr. et al. | 375/316 |
| 5,521,533 | 5/1996 | Swanke | 327/107 |
| 5,564,097 | 10/1996 | Swanke | 455/302 |

Primary Examiner—Stephen Chin
Assistant Examiner—Amanda T. Le
Attorney, Agent, or Firm—Mark M. Friedman

[57] ABSTRACT

A method of processing an electronic signal so as to facilitate the reduction of spurious signals, which includes mixing the electronic signal with a first synthesized signal of varying frequency to form a combined signal, passing the combined signal through at least one electronic component to produce an exiting signal, and mixing the exiting signal with a second synthesized signal of varying frequency which is correlated to the first synthesized signal, to form an output signal having spurious signals which are spread.

10 Claims, 3 Drawing Sheets

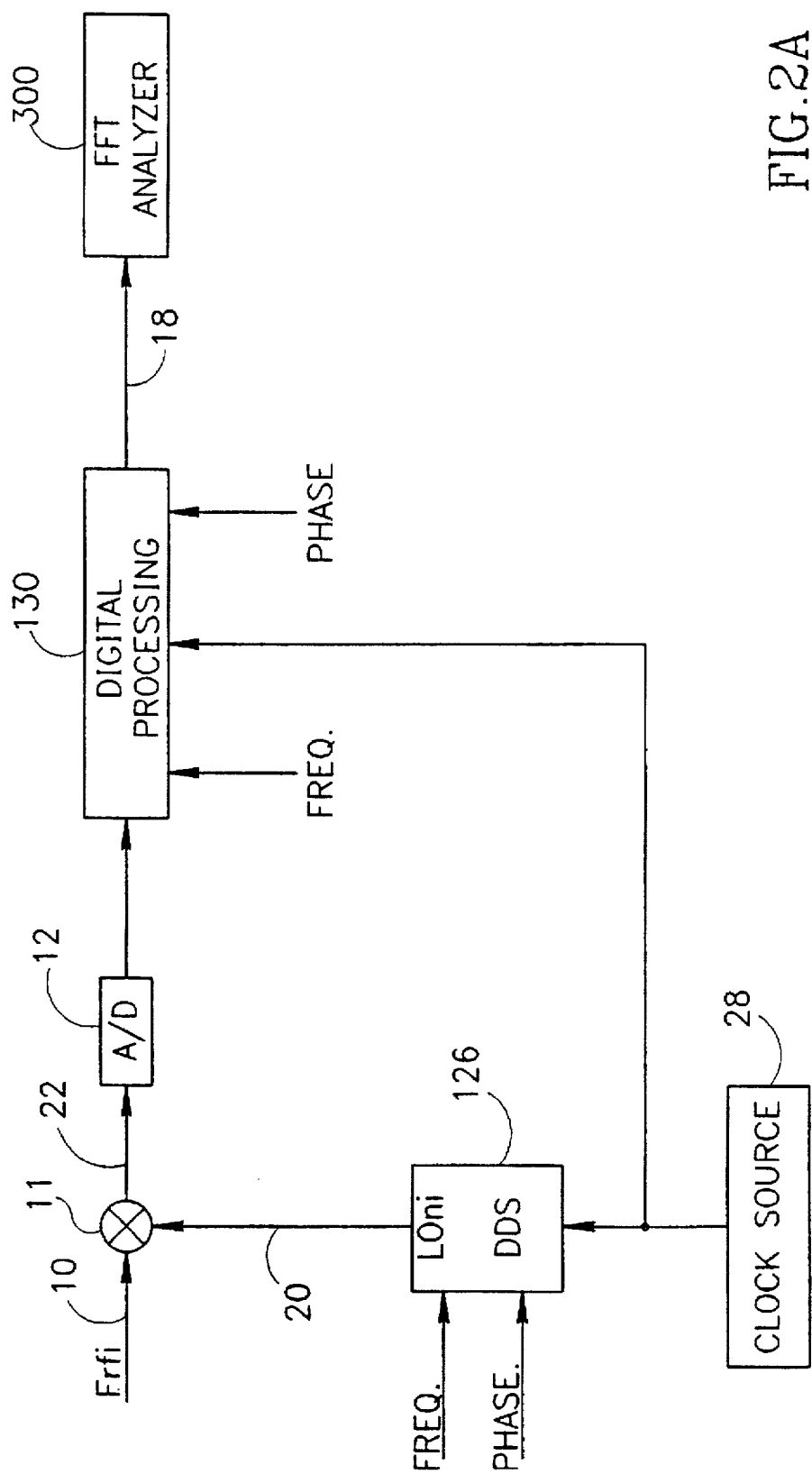

SPREADING OF SPURIOUS SIGNALS

FIELD AND BACKGROUND OF THE INVENTION

The present invention relates to techniques for reducing or eliminating spurious signals and, more particularly, to techniques which can be utilized to clean a signal of spurious signals which could otherwise be misinterpreted as actual signals by spreading and thus de-emphasizing the spurious signals and their harmonics.

In a large number of applications, it is desired to eliminate spurious signals which are a form of repeated noise typically caused by non-idealities of components of electronic systems and/or by quantization of signals, as is the case with A/D and D/A devices.

Various methods are known for reducing or eliminating spurious signals. These include the technique of sampling the signal at varying intervals, which tends to separate actual signals from spurious signals. A disadvantage of this technique is that it negates the possibility of effectively analyzing the signal spectrum (FFT) and of accurately delaying it.

Another technique which is currently in use is called dithering. A disadvantage of this technique is that its efficiency at high band widths is inadequate and it requires a high dynamic range.

There is thus a widely recognized need for, and it would be highly advantageous to have, a technique for reducing or eliminating spurious signals which would be of wide applicability, would be inexpensive and easy to deploy and implement.

SUMMARY OF THE INVENTION

According to the present invention there is provided a method of processing an electronic signal so as to facilitate the reduction of spurious signals, comprising: (a) mixing the electronic signal with a first synthesized signal of varying frequency to form a combined signal; (b) passing the combined signal through at least one electronic component to produce an exiting signal; (c) mixing the exiting signal with a second synthesized signal of varying frequency which is correlated to the first synthesized signal, to form an output signal wherein the spurious signals are spread.

According to another embodiment according to the present invention there is provided a method of processing an electronic signal so as to facilitate the ignoring of spurious signals, comprising: (a) mixing the electronic signal with a first synthesized signal of varying frequency to form a combined signal; (b) passing the combined signal through at least one electronic component to produce an exiting signal; and (c) mixing the exiting signal with a second synthesized signal of varying frequency which is correlated to the first synthesized signal, to form an output signal wherein the spurious signals are spread.

According to still another embodiment according to the present invention, there is provided a method for processing an electronic signal so as to facilitate the reduction of spurious signals, comprising: (a) mixing the electronic signal with a synthesized signal of varying frequency to form a combined signal; (b) passing the combined signal through at least one electronic component to produce an exiting signal; and (c) digitally processing the exiting signal to form an output signal wherein the spurious signals are spread.

According to further features in preferred embodiments of the invention described below, the first and second synthesized signals are generated by a frequency source, such as a synthesizer, for example, a direct digital synthesizer.

According to still further features in the described preferred embodiments the electronic component includes an analog to digital converter and a digital to analog converter.

The present invention successfully addresses the shortcomings of the presently known configurations by providing a method for reducing or eliminating spurious signals by spreading such signals and their harmonics so as to make it possible to clearly identify the true signals.

BRIEF DESCRIPTION OF THE DRAWINGS

The invention is herein described, by way of example only, with reference to the accompanying drawings, wherein:

FIG. 2A is a schematic representation of the method according to an embodiment similar to that of FIG. 2 but wherein the mixing of the exiting signal with a synthesized signal is effected digitally;

DESCRIPTION OF THE PREFERRED EMBODIMENTS

The present invention is of a method of processing an electronic signal so as to reduce the effect of, spurious signals.

The principles and operation of a method according to the present invention may be better understood with reference to the drawings and the accompanying description. The description which follows applies, for illustrative purposes only, to systems which include an A/D and D/A converters, or to systems having an A/D converter followed by digital processing, as shown in FIG. 2A. It is to be understood that it is not intended that the scope of the present invention be limited to such applications and that all applications are intended to fall within the scope of the present invention. In conventional systems including analog to digital and digital to analog convertors, an analog electronic signal is first converted using an A/D converter to a digital signal which is subsequently converted back to an analog signal in a D/A converter. The process of converting the signals from analog to digital and back produces undesired spurious signals in the form of harmonics, which are produced both because of the quantization of the signals and because of the non-idealities, or non-linearities of the converters. The output signal thus includes not only the true information but also a number of spurious signals which may mistakenly be taken to be actual information.

Figure 1:
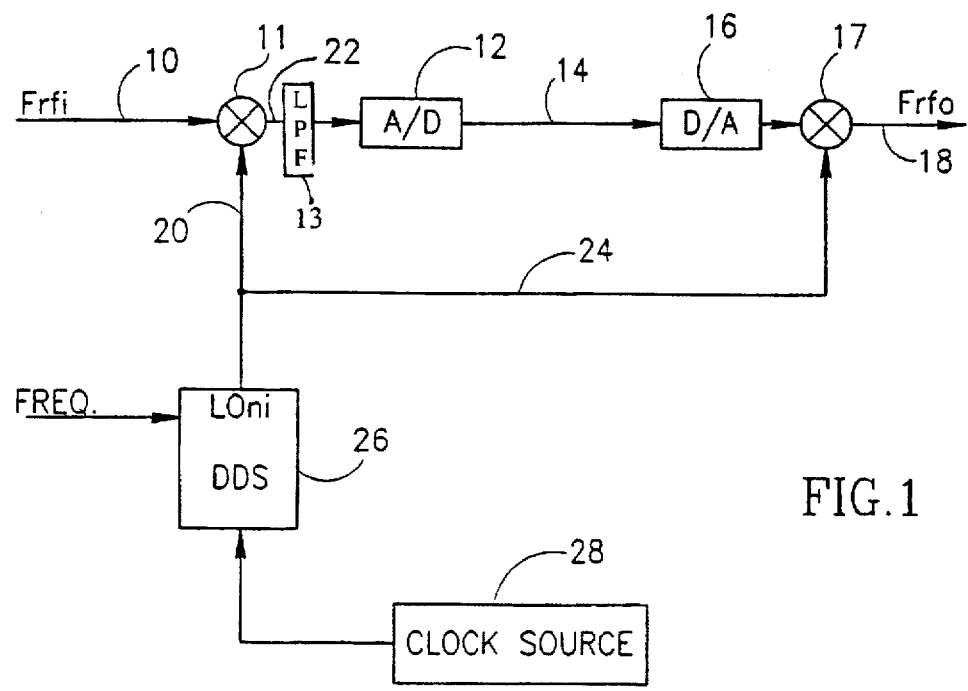
FIG. 1 is a schematic representation of the method according to the present invention in an application involving A/D and D/A converters.

To reduce or eliminate the deleterious effect of such spurious signals, one can use a method according to the present invention which is best understood with reference to the drawings. FIG. 1 schematically illustrates an application of a process according to the present invention. Here an analog electronic signal 10 is first convened, using an A/D converter 12, to a digital signal 14 which is subsequently converted, using a D/A convertor 16, back to an analog signal 18.

Prior to converting signal 10 to digital signal 14, signal 10 is mixed in a first mixer 11 with a first synthesized signal 20 to form a combined signal 22 which is then fed to A/D convertor 12. Preferably, combined signal 22 is first passed through a low pass filter 13, as will be described below. Similarly, the analog signal exiting D/A converter 16 is mixed in a second mixer 17 with second synthesized signal 24 which is, in this embodiment, identical with first synthesized signal 20, to form output analog signal 18.

Both first synthesized signal 20 and second synthesized signal 24 are produced by any convenient frequency source 26, such as a synthesizer, preferably a direct digital synthesizer. Frequency source 26 is driven by a suitable clock source 28.

Figure 2:
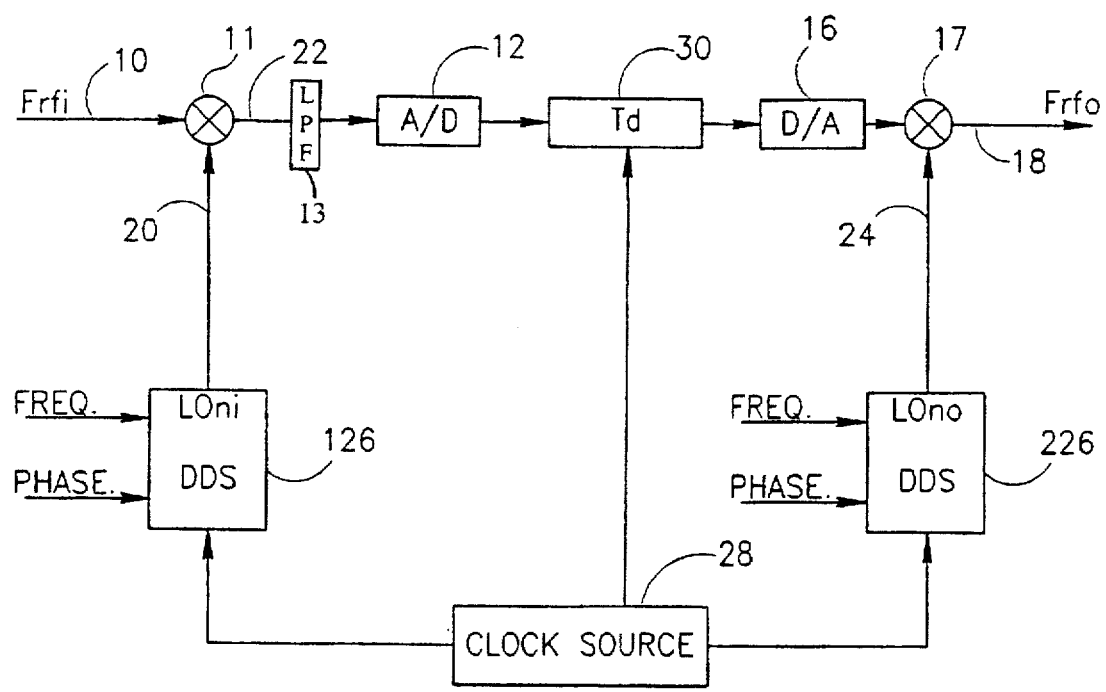
FIG. 2 is a schematic representation of the method according to the present invention in an application involving A/D and D/A converters and a time delay.

In applications involving a time delay 30 (FIG. 2), a first frequency source 126 and a second frequency source 226 are used, both of which are connected to clock source 28 and correlated to each other and to delay 30 both in terms of frequency and in terms of phase adjustment. Alternatively, as shown in FIG. 2A, the mixing of the exiting signal with a synthesized signal is effected digitally. The digital signal 14 produced by the A/D converter 12 is processed in a digital processor 130 and the resulting signal 18 can be fed to a suitable component, such as FFT analyzer 300 as shown in FIG. 2A.

Figure 4:
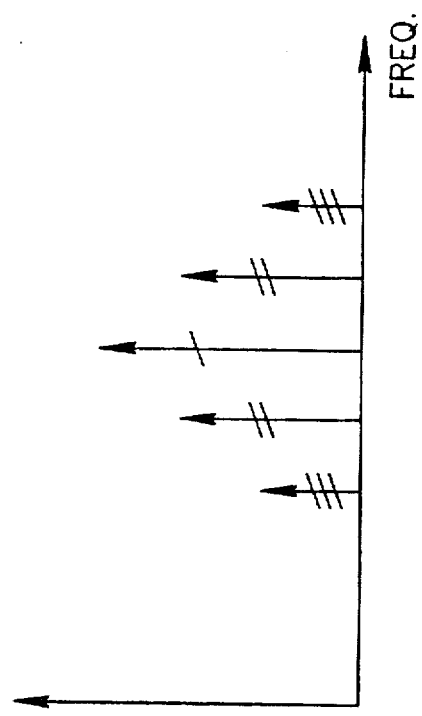
FIG. 4 is a schematic depiction of the output signal following the mixing of the signals of FIG. 3 with a second synthesized signal.
Figure 3:
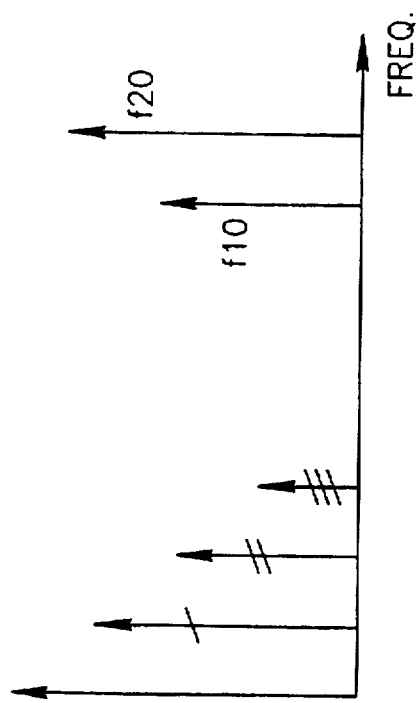
FIG. 3 is a schematic depiction of an electronic signal, a particular first synthesized signal and three harmonics created during the mixing process.
Figure 5:
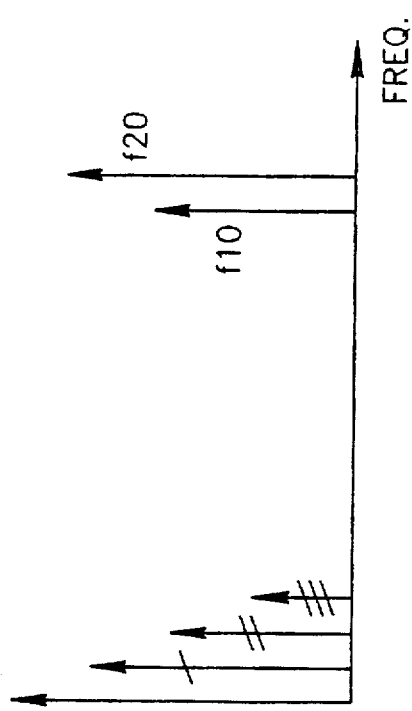
FIG. 5 is a schematic depiction of an electronic signal, another particular first synthesized signal and three harmonics created during the mixing process.

The principle of a method according to the present invention may be better understood with reference to FIGS. 3–6 and the accompanying description. Shown in FIGS. 3 and 5 are a signal 10, of frequency $F_{10}$ which is assumed to change relatively slowly. Also shown in FIGS. 3 and 5 is a signal 20, of frequency $f_{20}$, which is varied relatively quickly in comparison with the rate of change of the actual information signal 10. Thus, in FIG. 3, signal 20 ($f_{20}$) is seen to be about twice as far away from signal 10 ($f_{10}$), which remains at the same frequency, as in FIG. 5.

When the two signals are mixed in mixer 11 and the result is passed through one or more electronic component, such as A/D convertor 12 and D/A convertor 14, the result are the harmonic signals shown in the left-hand portions of FIGS. 3 and 5 which are caused by non-idealities in the electronic components and by the quantization procedures carried out by the convertors.

Without in any way limiting the scope of the present invention, if we assume that signals 10 and 20 are sinusoidal, then the mixing of the two signals results in signal 22, which can be represented, using trigonometric identities, by:

$$\sin f_{10}t \times \sin f_{20}t = \tfrac{1}{2}\cos(f_{10}-f_{20})t - \tfrac{1}{2}\cos(f_{10}+f_{20})t \quad (1)$$

The second term, $\cos(f_{10}+f_{20})$, on the right side, representing a high frequency signal, can be eliminated through, for example, the use of a low pass filter 13, following mixer 11. The remaining, $\cos(f_{10}-f_{20})$, term represents the left-most signal in FIGS. 3 and 5. That signal, in turn, has associated with it a number of harmonics, indicated in FIGS. 3 and 5 with a single, double and triple cross-hatch marks.

Figure 6:
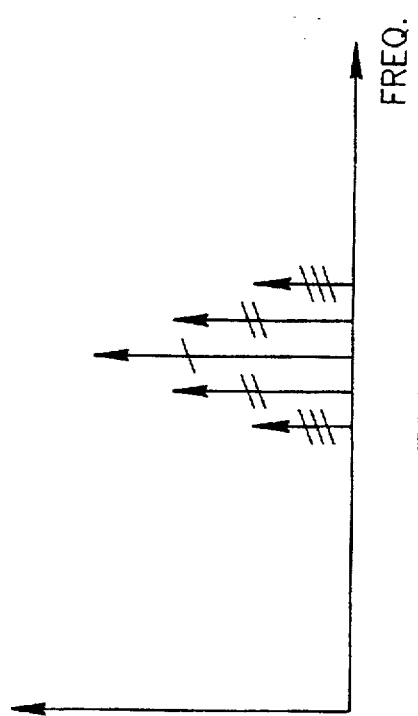
FIG. 6 is a schematic depiction of the output signal following the mixing of the signals of FIG. 5 with a second synthesized signal.

Mixing the combined signals of FIGS. 3 and 5 with second synthesized signals 24 results in signal as shown in FIGS. 4 and 6. As can be seen, the left-most signal in FIGS. 3 and 5 becomes the original signal 10 while the harmonics become smeared or spread to form an easily recognized spurious signal from which the actual, or good, signal can easily be recognized and retrieved.

The reconstruction of the original actual signal can be demonstrated when the combined signal is mixed with second synthesized signal 24, that is:

$$\tfrac{1}{2}\cos(f_{10}-f_{20})t \times \sin f_{24}t = \tfrac{1}{2}\{\tfrac{1}{2}\sin(f_{10}-f_{20}+f_{24})t - \tfrac{1}{2}\sin(f_{10}-f_{20}-f_{24})t\} \quad (2)$$

and, since $f_{20}=f_{24}$ in the embodiment of FIG. 1, $$\tfrac{1}{2}\cos(f_{10}-f_{20})t \times \sin f_{24}t = \tfrac{1}{2}\{\tfrac{1}{2}\sin(f_{10})t - \tfrac{1}{2}\sin(f_{10}-2f_{20})t\} \quad (3)$$

which demonstrates the regeneration of the original signal as well as the creation of a spread of well recognized spurious signals associated with the harmonics.

While the invention has been described with respect to a limited number of embodiments, it will be appreciated that many variations, modifications and other applications of the invention may be made.

What is claimed is:

1. A method for processing an electronic signal so as to facilitate the reduction of spurious signals, comprising:
   (a) mixing the electronic signal with a first synthesized signal of varying frequency to form a combined signal;
   (b) passing said combined signal through at least one electronic component to produce an exiting signal; and,
   (c) mixing said exiting signal with a second synthesized signal of varying frequency which is correlated to said first synthesized signal, to form an output signal wherein the spurious signals are spread;

wherein said component includes a time delay; and, wherein said first and second synthesized signals are phase adjusted.

2. A method as in claim 1 wherein said first and second synthesized signals are generated by a frequency source.

3. A method as in claim 2 wherein said frequency source is a synthesizer.

4. A method as in claim 2 wherein said frequency source is a direct digital synthesizer.

5. A method as in claim 2 wherein said frequency source is connected to a clock.

6. A method as in claim 1 wherein said electronic component includes an analog to digital converter.

7. A method as in claim 1 wherein said electronic component includes a digital to analog converter.

8. A method as in claim 1, wherein said component includes A/D and D/A converters, with said time delay located between said D/A and A/D converters.

9. A method as in claim 8, wherein said second synthesized signal is correlated to said first synthesized signal and to said delay, both in terms of frequency and in terms of phase adjustment.

10. A method as in claim 1, further comprising (a1) passing said combined signal through a low-pass filter, the resulting output of which is passed through said component.

* * * * *